Figure 1:
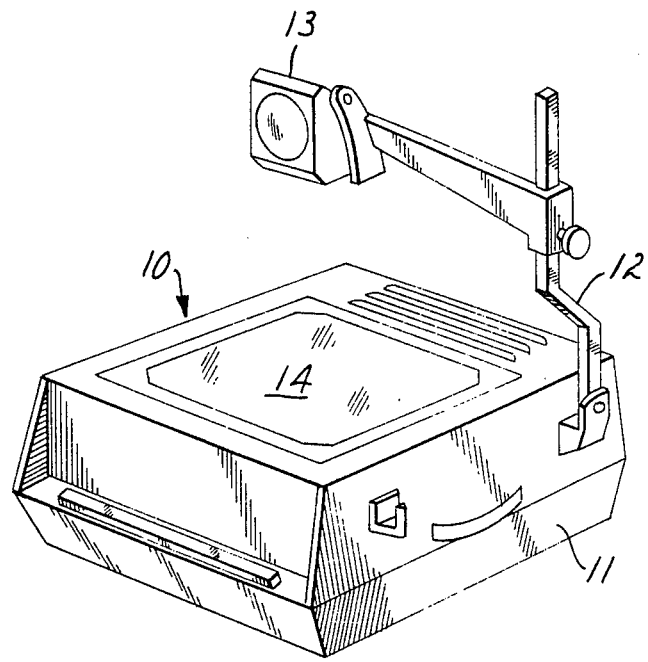

United States Patent
Conder et al.

[11] 3,982,822
[45] Sept. 28, 1976

[54] COMPOSITE FRESNEL LENS ASSEMBLY

[75] Inventors: Terrence M. Conder, Stillwater; Donald J. Newman, White Bear Lake Township, Ramsey County, both of Minn.

[73] Assignee: Minnesota Mining and Manufacturing Company, St. Paul, Minn.

[22] Filed: Mar. 3, 1975

[21] Appl. No.: 554,417

[52] U.S. Cl. .................................. 350/211; 353/38; 156/106
[51] Int. Cl.² ..................... G02B 3/08; G03B 21/14; B32B 17/00
[58] Field of Search ..................... 350/211; 353/38; 156/106

[56] References Cited
UNITED STATES PATENTS

| | | | |
|---|---|---|---|
| 3,511,563 | 5/1970 | Erwin | 350/211 |
| 3,539,412 | 11/1970 | Miller | 156/106 |
| 3,861,785 | 1/1975 | Barbour | 350/211 |
| 3,873,188 | 3/1975 | Barker | 350/211 |

*Primary Examiner*—John K. Corbin
*Assistant Examiner*—Conrad Clark
*Attorney, Agent, or Firm*—Alexander, Sell, Steldt & DeLaHunt

[57] ABSTRACT

Large area lens assembly, e.g., for an overhead projector, has glass stage bonded directly to plastic incremental lens to eliminate light-reflective interface and conserve space. Differential thermal expansion problems are overcome by critical selection of materials, dimensions and procedures. A unitary structure with multiple incremental lenses is made possible.

10 Claims, 3 Drawing Figures

U.S. Patent  Sept. 28, 1976  3,982,822

COMPOSITE FRESNEL LENS ASSEMBLY

This invention relates to transparent optical structure, more particularly to lens structures of large areas such as the condensing lenses of overhead projectors. In one aspect the invention relates to plastic echelon, incremental or Fresnel lenses and lens systems having a hard scratch-resistant surface and serving in an overhead projector both as a condensing lens and as a stage for supporting transparencies. In another aspect, the invention relates to compound lens systems, having a plurality of incremental lens surfaces, combined in a unitary structure useful in a compact overhead projector. The invention also relates to methods for producing and assembling such lenses and lens systems.

Fresnel condensing lenses for overhead projectors, for example as shown in U.S. Pat. Nos. 3,126,786 and 3,209,646, are most conveniently formed of transparent organic plastic materials such for example as methyl methacrylate polymer. Such polymers are relatively soft and susceptible of being scratched and marred. A scratch-resistant stage, e.g., of glass, is therefore needed to support the transparencies used to define the projected image. The resulting glass-to-air and plastic-to-air interfaces each reflect light and cause a decrease in optical efficiency of the projector.

The extreme difference in the thermal expansion of methacrylics and inorganic glass has heretofore been widely considered to prohibit any direct non-symmetrical bonding of the two, at least over the relatively large areas required for overhead projectors. With thermal coefficients of linear expansion of $80 \times 10^{-6}$ and $8.7 \times 10^{-6}$ respectively, panels of these two materials initially measuring 25 cm. on a dimension will show a differential of almost 2 mm. over a temperature change of 100°C. Temperature differences of this order of magnitude are frequently experienced in transporting and using overhead projectors. The requirements of an incremental lens surface add further complications. Thus, although glass panels have long been successfully bonded to each other, e.g., in the manufacture of so-called safety glass, large area non-symmetrical bonding of glass panels to plastic incremental lenses has not heretofore been successfully attempted, so far as we are aware.

It has now been found possible to bond together large area organic plastic lenses, such as Fresnel lenses of methyl methacrylate polymer, and panels of inorganic glass, i.e., having an area greater than 100 sq. cm., and preferably up to at least 800 sq. cm. as required for many overhead projectors, in a composite structure capable of withstanding temperature changes of at least 100°C. without distortion or disruption. It has further been found possible to incorporate additional plastic incremental lenses in a unitary structure, to provide a self-contained, temperature-stable, efficient stage and condensing lens system for a compact overhead projector.

Figure 2:
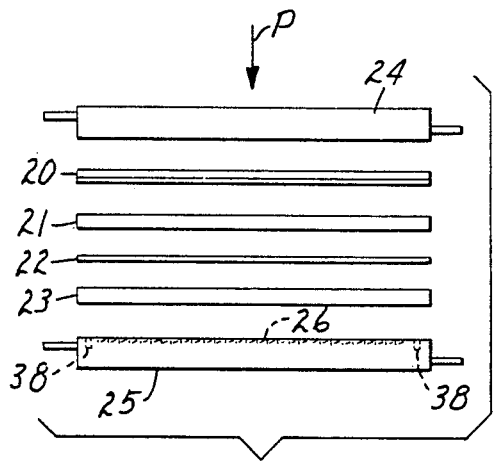
Figure 3:
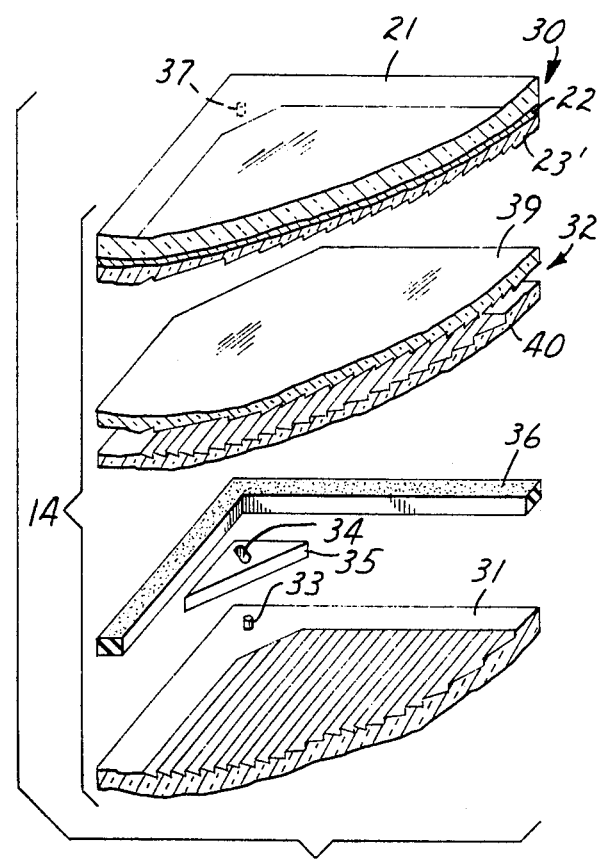

In the drawing,

FIG. 1 is a view in perspective of a compact portable overhead projector employing a combination stage and lens structure of the invention, FIG. 2 is a view in cross-section showing one form of stage and lens structure in process of formation, and FIG. 3 is an exploded perspective partial view showing the components and assembly of a more complex form of stage and lens structure incorporating the unit formed as indicated in connection with FIG. 2 and as used in the projector of FIG. 1.

The projector 10 of FIG. 1 comprises a case 11 containing a light source (not shown) and having a folding arm 12 and attached projection head 13. A unitary stage and lens assembly 14 lies between the light source and the projection head. The stage surface measures 25 × 25 cm.

FIG. 2 illustrates the preparation of a simple lens and stage structure. A compression pad 20, glass panel 21, bonding film 22, and plastic panel 23 are placed in a press between a smooth-surfaced platen 24 and a platen 25 having a negative incrementally grooved surface 26 and corner depressions 38. The assembly is first heated to soften the plastic components. Pressure is then applied as indicated by the arrow P, while simultaneously introducing a stream of cooling water through the platens. The press is then opened and the lens-stage combination removed.

A further structure, shown in FIG. 3, combines the combination 30 of stage 21, film 22 and lens 23 with a lens 31 and, if desired, a lens pair 32 to form a composite lens and stage assembly 14 as employed in the projector of FIG. 1. A rubbery gasket 36 is bonded between the smooth margins of the plastic lens 23' of the combination 30 and the lens 31 to hold the two together while affording a space for a lens pair 32.

Accurate positioning of the several components is afforded by the presence at three corners of lens 23' of alignment pegs 37, formed in apertures 38 of platen 25 and extending from the flat corner margins, and of opposing pegs 33 similarly formed on lens 31. These opposing pegs fit snugly within radially extending oval apertures 34 in corner inserts 35 or alternatively in similar apertures formed in the extended corner margins of an equivalent inner lens pair, not shown. The corner inserts serve to place and hold the two outer lenses in accurate optical alignment. The same function may be performed by the inner lens pair having equivalent perforate corners.

Lenses 23' and 31 may have a circular incremental lens pattern, for example as described in U.S. Pat. No. 3,334,958, in which case the inner lens pair 32 is omitted and alignment is obtained by means of corner inserts 35. Lenses 23' and 31 may alternatively have a linear incremental pattern and be oriented with their cylindrical axes at approximately a right angle to each other, as described in Anderson et al. application Ser. No. 499,138 filed Aug. 21, 1974, thereby replacing a single circular increment lens. A second pair of linear increment lenses, such as lenses 39, 40, may then be substituted for a second circular increment lens. The second pair are bonded together at the corners in permanent alignment and are further aligned within the stage-lens composite 14 either by contact of their truncated corners with the corners inserts 35 as illustrated in FIG. 3 or, preferably, by equivalent extension and perforation at their corners as noted hereinabove. The linear increment lenses are positioned so that the smallest angle between the axes of the inner pair and the outer pair is between 5 and 45 degrees.

In a specific illustrative example, the glass panel 21 is double strength float glass, 25 cm. on a side and having a thickness of 3.07 mm. The bonding film 21 is 0.75 mm. in thickness and is composed of 100 parts by weight of polyvinyl butyral and 37½ parts of inert plasticizer, e.g., dibutyl sebacate. The plastic panel 23 is of the same thickness and composed of methyl methacryl- ate polymer. It is coated on the surface adjacent the bonding film with a minimal smooth continuous coating of an inert resinous primer composition for promoting adhesion to the bonding film. A suitable primer is "Plexigum 2045" obtainable from Rohm & Haas Co. The incremental lens pattern is circular and contains 50 increments per inch of radius.

The assembly is preheated to 300°F. (150°C) and is then compacted under a pressure of 25 kg./sq. cm. Cooling is initiated at the time pressure is applied, the temperature at the center of the assembly being reduced to 100°F. (38°C) within about ½ minute. The press is then opened and the assembly removed.

Minor but otherwise disastrous inequalities in pressure between the platens are equalized by the presence of the compression pad 20, which consists of a 1.6 mm. layer of high temperature resistant silicone rubber on a supporting thin copper foil.

The stage-lens structure thus produced is found to be capable of undergoing temperature changes of from −30°F. to +165°F., such as may easily be experienced in going from a loading platform in northern latitudes during the winter to the interior of a closed car parked in direct sunlight in mid-summer, without any evidence of failure.

Some latitude in specific components may be permitted. Thus, the bonding web may be reduced to a thickness of 0.5 mm. and the plastic panel may be between about 0.6 and about 0.9 mm. These values may be changed where the thickness of the glass plate is also changed, providing the change is not excessive and similar ratios are maintained. Glass plates of less than about 2 mm. do not adequately withstand the pressures sometimes applied to projector stages; above about 4 mm. the structure is unnecessarily bulky and heavy, and subject to thermal shock. In general, the glass plate, bonding film and plastic panel will have relative thicknesses respectively of about 10:1.5–2.5:2.0–3.0.

With substantially thicker plastic panels, the stresses set up by large temperature changes are sufficient to cause bowing and breaking of the glass. Thinner plastic panels, on the contrary, are stretched and pulled apart. Drastic changes in the thickness of the bonding film also cause failure, primarily due to breaking or surface flaking of the glass panel.

Excellent bonding is obtained between the bonding film and the clean glass under the heat and pressure supplied. Direct bonding between the film and the plastic lens is less effective, but the presence of the transparent resinous primer coat provides for a fully adequate bond.

Although it would appear that extreme temperature changes might well cause distortion of both the bonding film and the plastic lens, as well as bowing of the entire panel, it is found that any such effects are so slight as to make no significant difference in the performance of the structure as an optical stage and lens. Furthermore, the unitary structure eliminates a glass-air and a plastic-air interface otherwise present in a stage and lens combination, with resultant improvement in optical efficiency.

A second lens 31 is pressed using the same circular increment pattern and an identical plastic panel. A gasket 36, of neoprene rubber having a densometer value of 40, is bonded to the flat margin of the second lens using a reclaim rubber-resin cement (EC-880 cement, obtainable from 3M Co.) and a further coating of the cement is applied to the opposite surface of the gasket. Corner inserts 35 are put in place over the pegs 33 and the stage-lens unit 30 is placed in position with the pegs 37 fitting in the slots 34 in line with the pegs 33 and with the flat margin cemented against the gasket. The thickness of the gasket is just slightly greater than the combined height of the two opposing pegs and the corner inserts.

In another example the incremental lens surfaces of lenses 23' and 31 have linear increments and are disposed with the line pattern of the one at an angle of 85° to that of the other. The corner inserts 35 are omitted, being replaced by a second pair of linear increment lenses disposed face to face and with lines also at 85°, the two being solvent-cemented together along the corner margins and having square corners with radially oriented oval perforations for alignment of the outer lenses. When thus aligned and assembled, the smallest angle between the cylindrical axes of the two pair of lenses is about 20°. Since all four of the lens panels are thin and the panels are closely compacted, the entire unitary structure requires but little space and thus assists in making possible a compact portable overhead projector. The lens surfaces are completely enclosed and protected, so that the assembly is easily cleaned. The glass stage surface is hard and resistant to scratching so that the transparencies may be marked as desired during projection without any permanent effect on the stage surface.

Further examples of the invention are as follows:

A cellulose acetate butyrate panel 0.5 mm. in thickness is bar-coated with a dissolved terpolymer of ethyl acrylate, N-vinyl pyrrolidone, and t-butyl acrylamide and forced-air dried at 140°F. (60°C.). Polyvinyl butyral sheeting 0.38 mm. in thickness and plasticized with 31 percent of triethylene glycol di(2-ethyl butyrate) is then placed in face-to-face contact between the coating on the cellulose acetate butyrate and double strength float glass. In a platen press, the assembly is heated to 255°F. (120°C.) for five seconds and then pressed at about 100 kg./sq. cm. using an 18-cm.-diameter ram for 15 seconds. While under pressure, the temperature is lowered to 100°F. (40°C.) before the press is opened.

In a different example, a sheet of extruded polymethyl methacrylate 0.75 mm. in thickness is bar-coated with a poly(hydroxyphenyl ether) resin (Phenoxy PKHH manufactured by Union Carbide) to give a dry weight of 15 g/m², and then overcoated with a polyvinyl butyral resin to give a dry weight of 11 g/m². Polyvinyl butyral sheeting plasticized with 31 percent triethylene glycol di(2-ethyl butyrate) is then placed between the polyvinyl butyral coating and double strength float glass. In a platen press, the assembly is heated to 310°F. (160°C.) for 5 seconds, followed by pressure application of 91 kg/sq. cm. using a 18-cm.-diameter ram for 25 seconds. The temperature is lowered to 100°F. (40°C.) before the press is opened.

Besides use in an overhead projector, large area optical elements of the invention have many other uses, for example, as a condensing lens in traffic signals, where an exterior scratch-resistant glass surface is desirable, and in certain display units.

What is claimed is as follows:

1. A large area optical element comprising a plastic lens element having an incremental lens surface and bonded over the opposite surface to a glass plate through an intervening bonding film of plasticized polyvinyl butyral, and wherein said glass plate, bonding film and plastic panel have relative thicknesses respectively of about 10:1.5–2.5:2.0–3.0.

2. Optical element of claim 1 wherein the glass panel has a thickness of about 3 mm., the bonding film has a thickness of about 0.5 – 0.75., and the plastic panel has a thickness of about 0.6 – 0.9 mm.

3. Optical element of claim 2 wherein the plastic panel has exposed incremental lens surfaces in concentric circles.

4. Optical element of claim 2 wherein the plastic panel has exposed incremental lens surfaces in parallel straight lines.

5. Optical element of claim 2 having a rectangular configuration and wherein is included a short cylindrical peg or boss extending from the corner margin of the embossed plastic panel at each of three corners.

6. A unitary stage and lens composite for an overhead projector, comprising the optical element of claim 5 and an additional rectangular plastic lens element, having correspondingly located short cylindrical pegs, in opposing position to the lens element thereof, the two being bonded together along their flat margins by an intervening adherent hard rubbery gasket.

7. Composite of claim 6 wherein said lens elements have incremental lens surfaces in axially aligned concentric circles.

8. Composite of claim 6 wherein said lens elements each have incremental lens surfaces in parallel straight lines and disposed at approximately right angles with those of the other.

9. Composite of claim 8 wherein is included an additional plurality of similarly disposed linear incremental lenses enclosed within said gasket and between said plastic lens and said additional plastic lens.

10. Composite of claim 6 wherein is included an insert for at least each corner at which said opposing pegs are located and perforated at least at each said corner to provide oval apertures in radial alignment with the center of said composite and within which apertures said opposing pegs are confined in axial alignment.

* * * * *